(12) United States Patent
Yoshii

(10) Patent No.: US 6,816,928 B1
(45) Date of Patent: Nov. 9, 2004

(54) PACKET COMMUNICATION APPARATUS WITH FIRST AND SECOND PROCESSING CIRCUITS WHICH ACCESS A STORAGE CIRCUIT DURING FIRST AND SECOND TIME PERIODS, RESPECTIVELY

(75) Inventor: Nobuyuki Yoshii, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/493,033

(22) Filed: Jan. 28, 2000

(30) Foreign Application Priority Data

Jan. 29, 1999 (JP) .......................................... 11-021264

(51) Int. Cl.⁷ ............................................... G06F 3/00
(52) U.S. Cl. ................................. 710/45; 710/5; 710/6; 710/36; 711/106
(58) Field of Search ........................... 710/5, 6, 18, 24, 710/25, 28, 33, 36, 37, 45; 711/106

(56) References Cited

U.S. PATENT DOCUMENTS

| | | | | |
|---|---|---|---|---|
| 3,748,651 A | * | 7/1973 | Mesnik | 365/222 |
| 4,611,275 A | * | 9/1986 | Garnier | 710/109 |
| 4,723,204 A | * | 2/1988 | Khera | 365/222 |
| 5,261,109 A | * | 11/1993 | Cadambi et al. | 710/111 |
| 5,301,332 A | * | 4/1994 | Dukes | 710/244 |
| 5,752,266 A | * | 5/1998 | Miyawaki et al. | 711/158 |
| 6,338,108 B1 | * | 1/2002 | Motomura | 710/110 |

FOREIGN PATENT DOCUMENTS

| | | |
|---|---|---|
| JP | 5-276153 | 10/1993 |
| JP | 7-154359 | 6/1995 |
| JP | 08-276047 | 10/1996 |
| JP | 9-102192 | 4/1997 |

* cited by examiner

*Primary Examiner*—Jeffrey Gaffin
*Assistant Examiner*—Eron Sorrell
(74) *Attorney, Agent, or Firm*—Rabin & Berdo, P.C.

(57) ABSTRACT

A packet communication apparatus processes consecutively transmitted fixed-length packets. The apparatus includes a storage circuit, a first processing circuit which accesses the storage circuit for processing data obtained from each of the packets, and a second processing circuit which accesses the storage circuit for processing data stored in the storage circuit. The apparatus further includes an allocation circuit for executing access time allocation with respect to a packet processing time allowed for processing each of the packets. Specifically, the allocation circuit allocates a first time of the packet processing time to the first processing circuit for accessing the storage circuit and a second time of the packet processing time to the second processing circuit for accessing the storage circuit. The first time and the second time are prevented from overlapping with each other.

10 Claims, 13 Drawing Sheets

PACKET COMMUNICATION APPARATUS WITH FIRST AND SECOND PROCESSING CIRCUITS WHICH ACCESS A STORAGE CIRCUIT DURING FIRST AND SECOND TIME PERIODS, RESPECTIVELY

BACKGROUND OF THE INVENTION

1. Field of the Invention

The present invention relates to a packet communication apparatus for processing fixed-length packets and, in particular, to a packet communication apparatus wherein reading and writing of packet data are executed relative to a storage circuit.

2. Description of the Related Art

In addition to merely switching or exchanging packets, a fixed-length packet exchange implements predetermined processing with respect to packet data of the packets. For example, when a charge is determined according to the number of switched packets, the packet exchange counts the number of switched packets per destination and charges a sender for it. The packet exchange also obtains predetermined statistical information from the packet data of the packets. Further, the packet exchange detects and corrects an error using data which is attached to each packet for error detection and correction.

For accomplishing the foregoing processing including the packet switching, the packet exchange includes a storage circuit for storing packet data of received packets and other data. The packet exchange further includes a first processing circuit for reading packet data from each packet, reading necessary data from the storage circuit, performing processing such as routing and error detection and correction, and writing resultant data into the storage circuit and the corresponding packet. The processing implemented by the first processing circuit is essential upon receipt of each packet for the purpose of a packet transfer. The packet exchange further includes a second processing circuit which performs reading and writing relative to the storage circuit for processing data stored therein as required by a control system of the packet exchange. The processing implemented by the second processing circuit is not essential upon receipt of each packet. Thus, the processing implemented by the first processing circuit has higher priority than the processing implemented by the second processing circuit.

The storage circuit is designed to prohibit simultaneous accesses thereto by the first and second processing circuits. Thus, the first and second processing circuits should selectively access the storage circuit. As described above, the processing implemented by the first processing circuit has the higher priority than the processing implemented by the second processing circuit. Under the circumstances, according to the conventional technique, only the first processing circuit is allowed to access the storage circuit during a packet processing time (time allowed for exchanging each packet), and the second processing circuit is allowed to access the storage circuit only while there exist no packets to be exchanged.

However, according to the conventional technique, the second processing circuit can not access the storage circuit at all if packets are consecutively exchanged. As a result, an access to the storage circuit by the second processing circuit should await for a long time until there exist no packets to be exchanged. This causes a problem that execution of the predetermined processing by the second processing circuit is likely to be delayed. Further, for the same reason, there is also a problem that if the foregoing storage circuit is a DRAM (dynamic random access memory), the DRAM can not be refreshed periodically.

SUMMARY OF THE INVENTION

Therefore, it is an object of the present invention to provide an improved packet communication apparatus.

According to one aspect of the present invention, there is provided a packet communication apparatus for processing consecutive fixed-length packets, the apparatus comprising a storage circuit; a first processing circuit which accesses the storage circuit for executing first processing with respect to data obtained from each of the packets; a second processing circuit which accesses the storage circuit for executing second processing with respect to data stored in the storage circuit; and an allocation circuit for executing access time allocation with respect to a packet processing time allowed for processing each of the packets, the allocation circuit allocating a first time of the packet processing time to the first processing circuit for accessing the storage circuit and a second time of the packet processing time to the second processing circuit for accessing the storage circuit, the first time and the second time prevented from overlapping with each other.

It may be arranged that the storage circuit is a DRAM, and the second processing circuit refreshes the DRAM during the second time.

It may be arranged that the packet communication apparatus further comprises a producing circuit which receives a first packet synchronizing signal having first signal components each indicative of a boundary time point between the adjacent packets and produces a second packet synchronizing signal based on the first packet synchronizing signal, wherein the producing circuit, in response to one of the first signal components, produces in sequence second signal components of the second packet synchronizing signal at a given cycle corresponding to the packet processing time, the given cycle being free of an influence of the first signal components subsequent to the one of the first signal components, and wherein the allocation circuit executes the access time allocation based on the second packet synchronizing signal.

It may be arranged that the producing circuit comprises a counter which produces in sequence the second signal components at the given cycle in response to the one of the first signal components, and a control circuit which inhibits any of the first signal components being asynchronous with the given cycle from being inputted into the counter.

It may be arranged that the packet communication apparatus further comprises a producing circuit which receives a first packet synchronizing signal having first signal components each indicative of a boundary time point between the adjacent packets and produces a second packet synchronizing signal based on the first packet synchronizing signal, wherein the producing circuit produces second signal components of the second packet synchronizing signal in response to the first signal components such that any of the first signal components which is advanced in phase relative to the packet processing time is prevented from reflecting on the second packet synchronizing signal, and wherein the allocation circuit executes the access time allocation based on the second packet synchronizing signal.

It may be arranged that the producing circuit comprises a control circuit which receives the first signal components, and a first counter which produces each of the second signal components in response to a corresponding input from the control circuit, and that the control circuit inhibits any of the first signal components, which is advanced in phase relative to the packet processing time, from being inputted into the first counter.

It may be arranged that the producing circuit further comprises a second counter which, in response to an input of each of the first signal components, outputs a corresponding signal component to the control circuit, while the second counter outputs a signal component to the control circuit at a given cycle corresponding to the packet processing time when no input is given to the second counter.

According to another aspect of the present invention, there is provided a packet communication apparatus for processing consecutive fixed-length packets, the apparatus comprising a DRAM; a processing circuit which accesses the DRAM for processing data obtained from each of the packets; a refresh circuit for refreshing the DRAM; and an allocation circuit for executing access time allocation with respect to a packet processing time allowed for processing each of the packets, the allocation circuit allocating a first time of the packet processing time to the processing circuit for accessing the DRAM and a second time of the packet processing time to the refresh circuit for refreshing the DRAM, the first time and the second time prevented from overlapping with each other.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, first to fourth preferred embodiments of the present invention will be described hereinbelow with reference to the accompanying drawings. In the first to fourth preferred embodiments, a packet communication apparatus is a packet exchange.

<First Embodiment>

Figure 1:
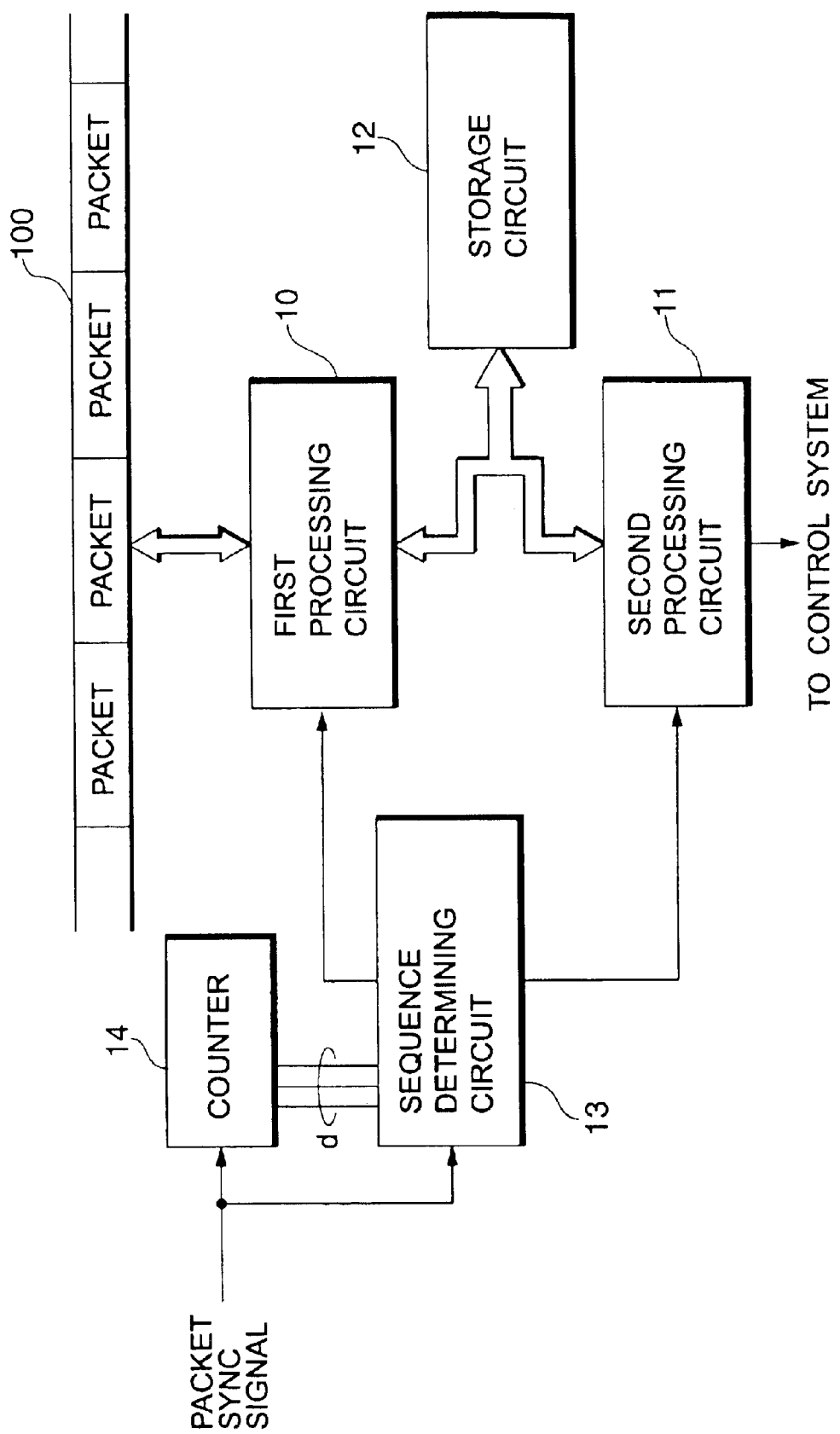
FIG. 1 is a diagram showing a configuration of a main part of a packet exchange according to a first preferred embodiment of the present invention.

FIG. 1 shows a configuration of a main part of a packet exchange according to the first preferred embodiment of the present invention. The packet exchange switches a packet stream 100 composed of consecutive fixed-length packets. The packet exchange comprises a first processing circuit 10, a second processing circuit 11 and a storage circuit 12. As described in the background of the invention, the first processing circuit 10 accesses the storage circuit 12 for processing data obtained from each of the packets, while the second processing circuit 11 accesses the storage circuit 12 for processing data stored therein as required by a control system of the packet exchange. The storage circuit 12 temporarily stores those data necessary for the processing by the first and second processing circuits 10 and 11. The storage circuit 12 is designed to prohibit the first and second processing circuits 10 and 11 from accessing it simultaneously, while allowing the first and second processing circuits 10 and 11 to selectively access it.

According to this embodiment, the packet exchange further comprises a sequence determining circuit 13. Based on a packet synchronizing signal having pulses indicative of boundary time points between adjacent packets in the packet stream 100 and a counter value signal d from a counter 14 which starts counting upon receipt of each pulse of the packet synchronizing signal, the sequence determining circuit 13 implements access time allocation to the first and second processing circuits 10 and 11.

Figure 2:
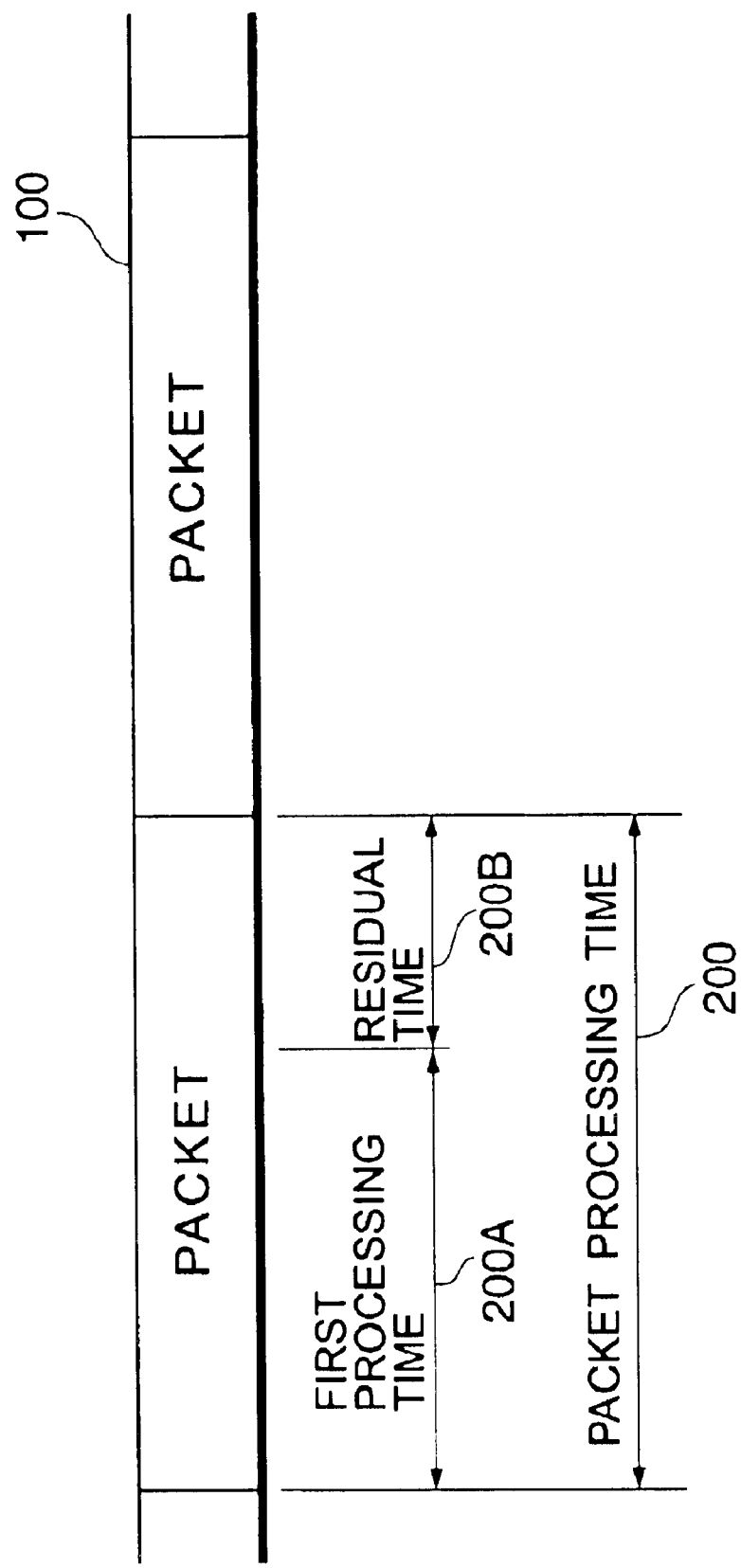
FIG. 2 is a diagram for explaining a packet processing time allowed for exchanging each packet.

FIG. 2 is a diagram for explaining a packet processing time 200. The packet processing time 200 is determined corresponding to a packet length and is a maximum time allowed for exchanging each packet. In this embodiment, the sequence determining circuit 13 allocates a first processing time 200A to the first processing circuit 10 for an access to the storage circuit 12 and a second processing time (residual time) 200B to the second processing circuit 11 for an access to the storage circuit 12.

In practice, the sequence determining circuit 13 implements the access time allocation to the first and second processing circuits 10 and 11 in the following manner:

It is assumed that the packet processing time 200 is 27 and the first processing time is 18 and that the counter 14 is a 27 counter outputting 0 to 26 values. In this case, the sequence determining circuit 13 allocates an access time of, for example, 5 to 22 to the first processing circuit 10 and a residual time of counter values 23 to 4 to the second processing circuit 11. The first processing circuit 10 uses a time of counter values 0 to 4 for reading packet data from a corresponding packet and further uses a time of counter values 23 to 26 for writing resultant packet data into the packet. The specific access time allocation becomes as follows:

0: trigger the first processing circuit 10

0 to 4: reading data from a packet 5 to 22: reading and writing data relative to the storage circuit 12

23 to 26: writing data into the packet
22: trigger the second processing circuit 11
(in consideration of a startup time of the second processing circuit 11, the trigger is given at counter value 22)
23 to 4: reading and writing data relative to the storage circuit 12 (only upon request from the control system of the packet exchange, the second processing circuit 11 is started up)

Accordingly, the first processing circuit 10 can access the storage circuit 12 during the first processing time (counter values 5 to 22), while the second processing circuit 11 can access the storage circuit 12 during the residual time (counter values 23 to 4). FIG. 2 shows the first processing time 200A as starting from the start of the packet processing time 200, which, however, is for simplifying the explanation.

As described above, according to the foregoing first preferred embodiment, the first processing circuit 10 accesses the storage circuit 12 during the first processing time of the packet processing time, while the second processing circuit 11 accesses the storage circuit 12 during the residual time of the packet processing time. Thus, as opposed to the foregoing conventional technique, the second processing circuit 11 can perform reading and writing of data relative to the storage circuit 12 periodically so that a delay of the processing by the second processing circuit 12 can be prevented.

<Second Embodiment>

In the second preferred embodiment of the present invention, the packet exchange in the foregoing first preferred embodiment is further provided with a protection circuit.

Figure 3:
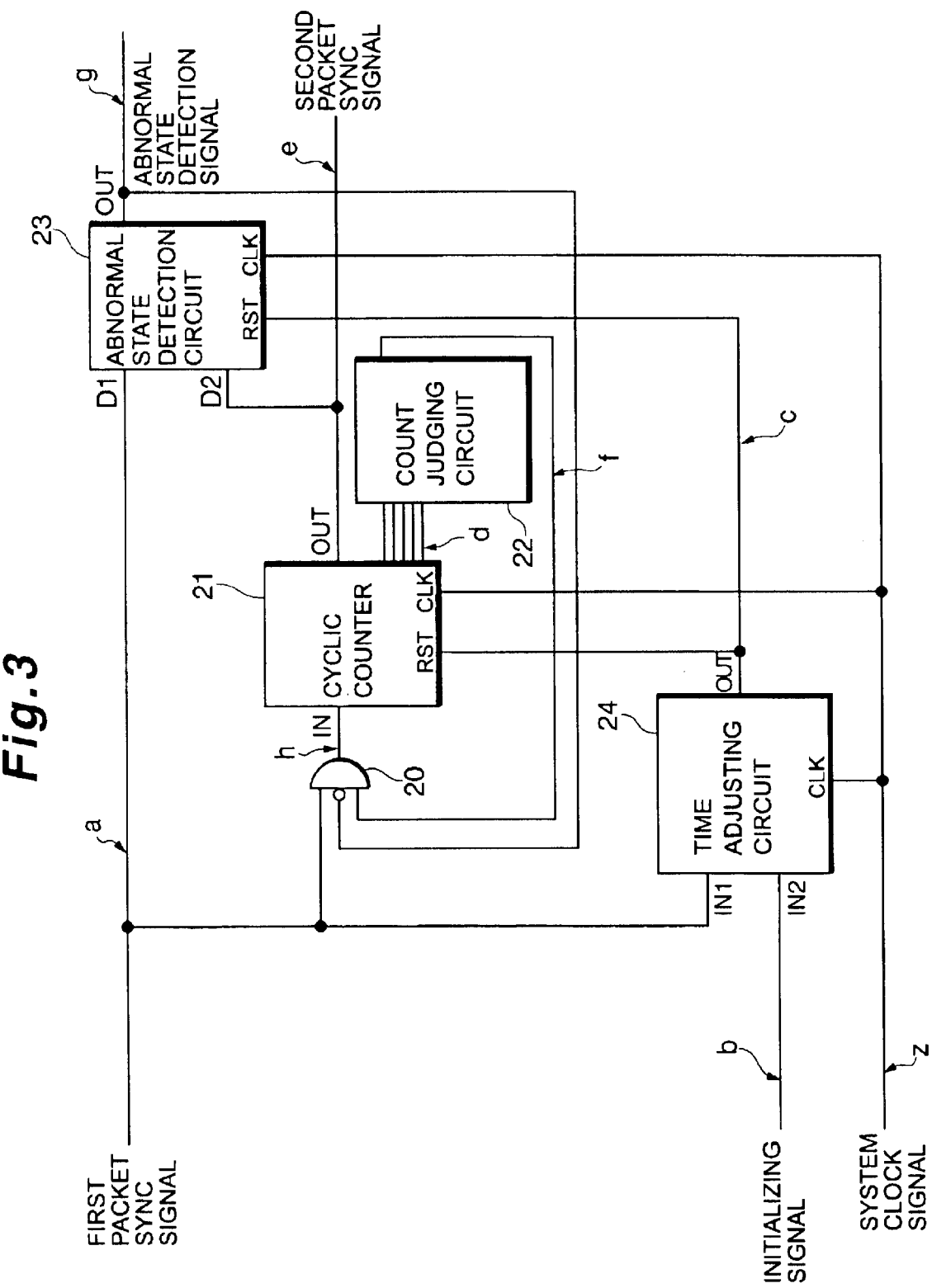
FIG. 3 is a diagram showing a configuration of a protection circuit incorporated in a packet exchange according to a second preferred embodiment of the present invention.
Figure 4:
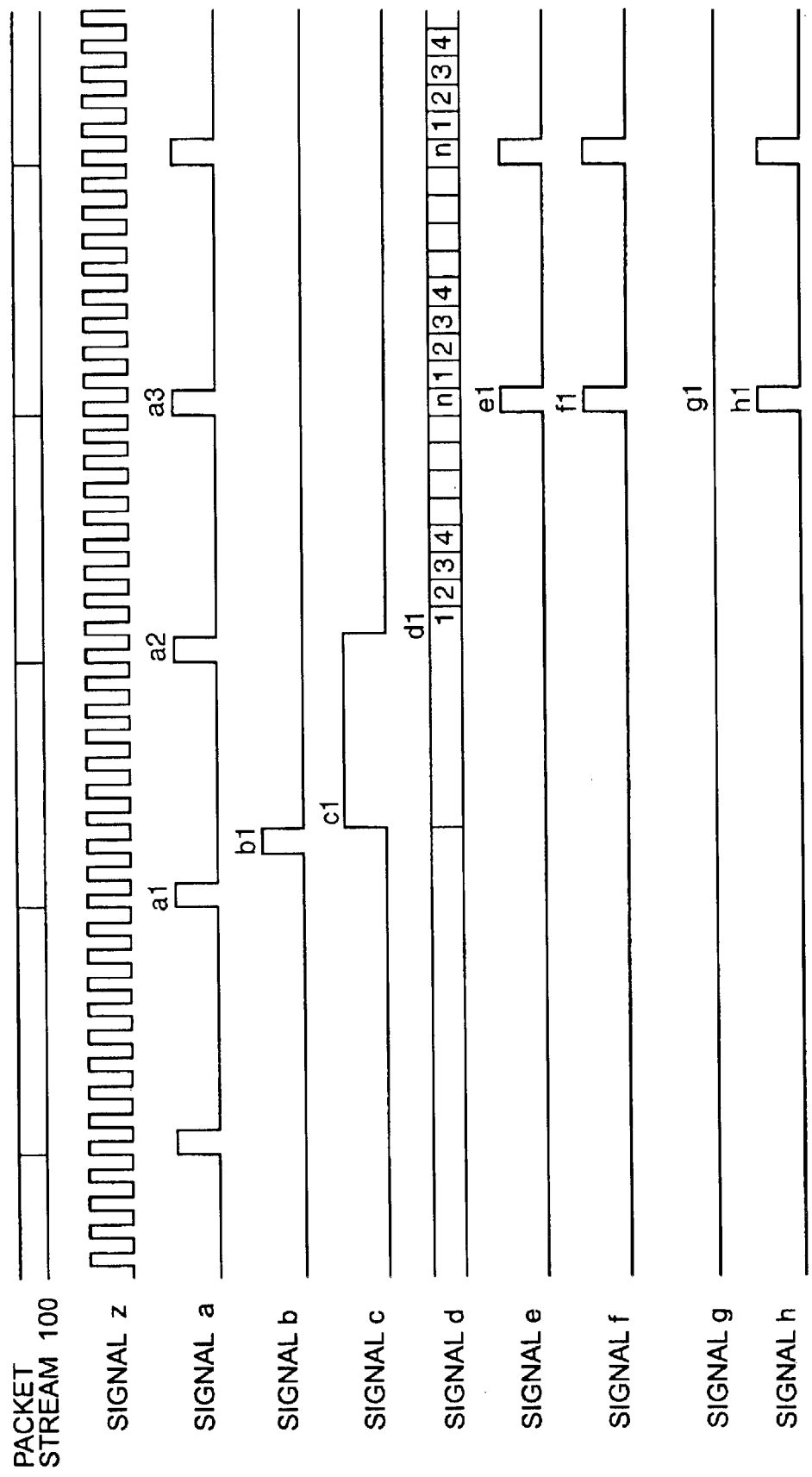
FIG. 4 is a diagram showing an operation of the protection circuit when a first packet synchronizing signal is in a normal state.
Figure 5:
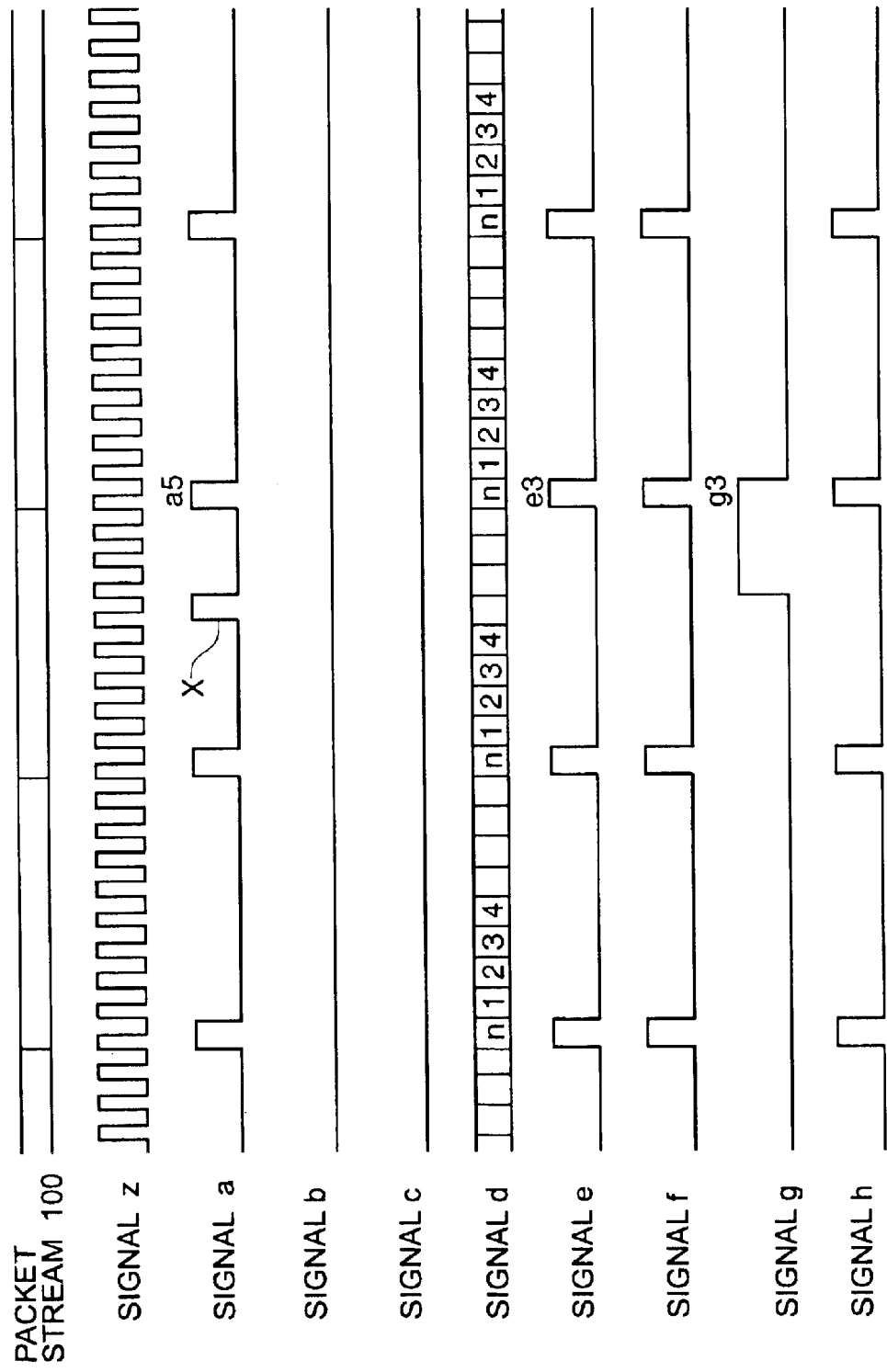
FIG. 5 is a diagram showing an operation of the protection circuit upon occurrence of an unwanted pulse in the first packet synchronizing signal.
Figure 6:
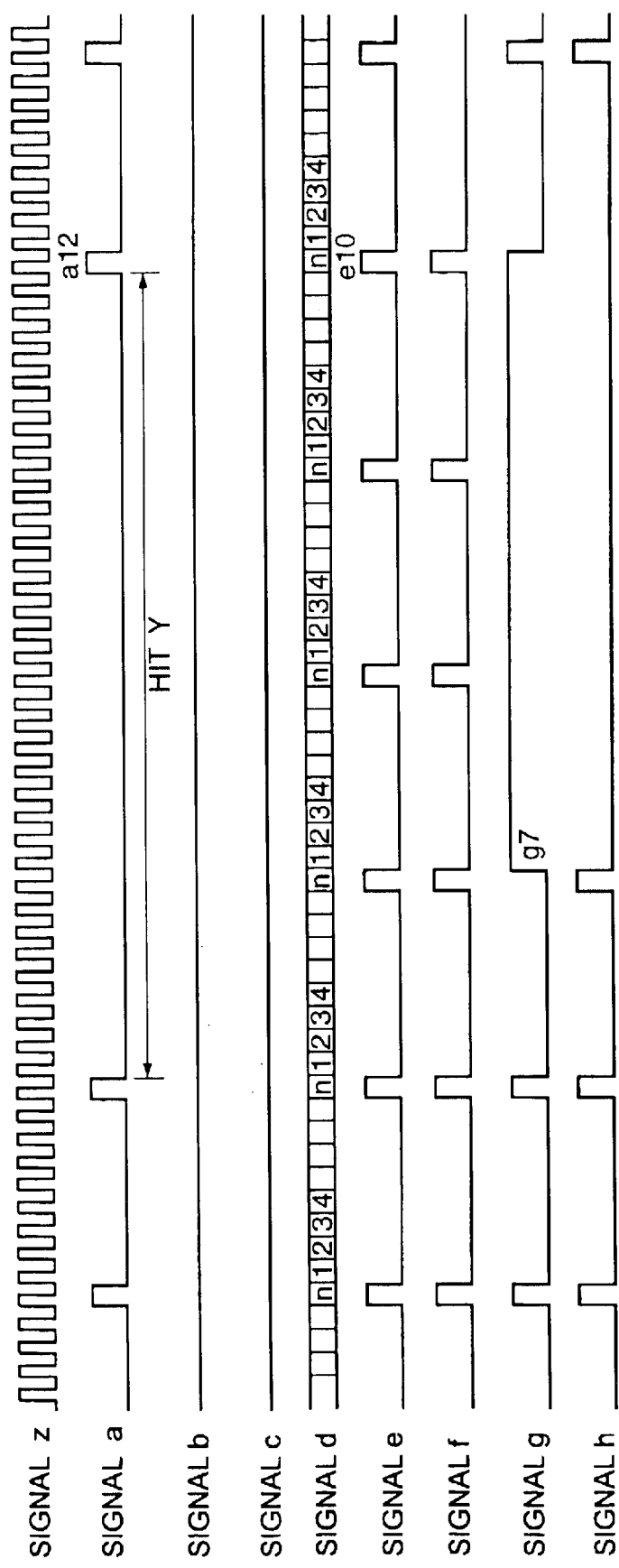
FIG. 6 is a diagram showing an operation of the protection circuit upon occurrence of a hit in the first packet synchronizing signal.

FIG. 3 shows a configuration of the protection circuit, and FIGS. 4 to 6 show operations of the protection circuit, respectively. As shown in FIG. 3, the protection circuit is inputted with a first packet synchronizing signal a, an initializing signal b and a system clock signal z, and outputs a second packet synchronizing signal e and an abnormal state detection signal g. The first packet synchronizing signal a corresponds to the packet synchronizing signal in the foregoing first preferred embodiment. The system clock signal z is reference clock pulses which are used for an operation of the protection circuit. The initializing signal b is for starting an operation of the protection circuit after the packet exchange has been booted. The second packet synchronizing signal e is produced based on the first packet synchronizing signal a, which will be described later in detail. The second packet synchronizing signal e is inputted into the sequence determining circuit 13 shown in FIG. 1 instead of the packet synchronizing signal in the foregoing first preferred embodiment. The abnormal state detection signal g is indicative of an occurrence of noise, i.e. an abnormal state, in the first packet synchronizing signal a. The abnormal state includes an occurrence of an unwanted pulse or an occurrence of a hit in the first packet synchronizing signal a.

As shown in FIG. 3, the protection circuit comprises a control circuit 20, a cyclic counter 21, a count judging circuit 22, an abnormal state detection circuit 23 and a time adjusting circuit 24. The control circuit 20 inhibits the first packet synchronizing signal a from being fed to the cyclic counter 21 while the first packet synchronizing signal a is in the abnormal state. In response to a later-described signal c, the cyclic counter 21 starts counting and spontaneously repeats counting from 1 to n (n is an integer corresponding to the packet processing time 200 shown in FIG. 2) regardless of the state of a signal h outputted from the control circuit 20. Every time a counter value reaches n, the cyclic counter 21 outputs a pulse in the second packet synchronizing signal e representing a boundary time point between adjacent packets in the packet stream 100. The cyclic counter 21 corresponds to the counter 14 in the foregoing first preferred embodiment. The count judging circuit 22 is inputted with a counter value signal d from the cyclic counter 21. The count judging circuit 22 outputs a signal f which becomes high when the counter value is n, while remains low when the counter value is other than n. The signal f is inputted to the control circuit 20. The abnormal state detection circuit 23 judges whether the first packet synchronizing signal a and the second packet synchronizing signal e agree with each other. Only when not agreeing with each other, the abnormal state detection circuit 23 outputs a pulse in the abnormal state detection signal g as representing an occurrence of an abnormal state. The abnormal state detection signal g is inversely inputted into the control circuit 20 and is also fed to the control system of the packet exchange. Based on the first packet synchronizing signal a and the initializing signal b, the time adjusting circuit 24 produces a pulse in the signal c which is fed to the cyclic counter 21 and the abnormal state detection circuit 23 for starting operations thereof.

Now, operations of the protection circuit in this embodiment will be described with reference to FIGS. 4 to 6.

<Normal State>

An operation of the protection circuit when the first packet synchronizing signal a is in the normal state will be described with reference to FIG. 4. The first packet synchronizing signal a includes pulses (a1, a2, a3 . . . ) which are produced periodically to represent boundary time points between adjacent packets, wherein the packet processing time 200 represents one period. When a pulse b1 is produced in the initializing signal b at an arbitrary time point to command the startup of the protection circuit, the time adjusting circuit 24 continues to output a high level until an occurrence of a pulse a2 representing the next boundary time point, so as to produce a pulse c1 which starts up the cyclic counter 21 and the abnormal state detection circuit 23. From the startup (d1) at the occurrence of the pulse a2, the cyclic counter 21 starts counting up to value n. Upon counting value n, the cyclic counter 21 outputs a pulse e1 in the second packet synchronizing signal e representing a boundary time point between adjacent packets. Then, the cyclic counter 21 starts counting again from value 1 and, by repeating counting from 1 to n, the cyclic counter 21 produces the second packet synchronizing signal e which fully agrees with the first packet synchronizing signal a.

Since the pulse e1 is outputted at a time point after a lapse of the packet processing time 200 from the pulse a2, a position of the pulse e1 coincides with a position of the pulse a3 representing the next boundary time point. Thus, the abnormal state detection circuit 23 does not produce a pulse in the abnormal state detection signal g as represented at g1. Since the abnormal state detection signal g is inversely inputted into the control circuit 20, an input to the control circuit 20 is high when no pulse is produced in the abnormal state detection signal g. On the other hand, the count judging circuit 22 produces a high level when the counter value of the cyclic counter 21 is n, and thus produces a pulse f1. Accordingly, in response to receipt of the pulse f1 and the pulse a3, the control circuit 20 produces a pulse h1 in the signal h which is inputted into the cyclic counter 21. Actually, in response to an input of a pulse, the cyclic counter 21 is set to value n to output a pulse and starts counting again from value 1. However, in the normal state of the first packet synchronizing signal a, the first packet synchronizing signal a and the second packet synchronizing signal e fully match with each other, the input of the pulse h1 into the cyclic counter 21 causes no influence onto the counting cycle, i.e. the counter values, of the cyclic counter 21.

<Occurrence of Unwanted Pulse>

An operation of the protection circuit upon occurrence of an unwanted pulse in the first packet synchronizing signal a will be described with reference to FIG. 5. It is assumed that the protection circuit has been operated in response to the initializing signal b. As described above, the cyclic counter 21 repeats counting from 1 to n to output corresponding pulses after the startup in response to the signal c even when no input is given. When an unwanted pulse X is produced in the first packet synchronizing signal a, the first packet synchronizing signal a and the second packet synchronizing signal e do not agree with each other. Thus, the abnormal state detection circuit 23 outputs a high level until both signals agree with each other. To be exact, the abnormal state detection circuit 23 outputs a high level until the next pulse a5 and the next pulse e3 agree with each other so as to produce a pulse g3. Since the pulse g3 is inputted, the control circuit 20 does not produce any pulse. Thus, the second packet synchronizing signal e is free of an occurrence of an unwanted pulse in the first packet synchronizing signal a.

<Occurrence of Hit>

An operation of the protection circuit upon occurrence of a hit in the first packet synchronizing signal a will be described with reference to FIG. 6. It is assumed that the protection circuit has been operated in response to the initializing signal b. As described above, the cyclic counter 21 repeats counting from 1 to n to output corresponding pulses after the startup in response to the signal c even when no input is given. When a hit Y occurs in the first packet synchronizing signal a, the first packet synchronizing signal a and the second packet synchronizing signal e do not agree with each other. Thus, the abnormal state detection circuit 23 outputs a high level until both signals agree with each other. To be exact, the abnormal state detection circuit 23 outputs a high level until the next pulse a12 and the next pulse e10 agree with each other so as to produce a pulse g7. Since the pulse g7 is inputted and further the first packet synchronizing signal a has no pulses, the control circuit 20 does not produce any pulse. Thus, the second packet synchronizing signal e is free of an occurrence of a hit in the first packet synchronizing signal a.

As described above, according to the foregoing second preferred embodiment, the cyclic counter 21 repeats counting from 1 to n, which corresponds to the packet processing time, after the startup in response to the signal c, thereby to produce the second packet synchronizing signal e. Thus, the second packet synchronizing signal e is synchronous with the packet processing time and free of the abnormal state of the first packet synchronizing signal a. Since the second packet synchronizing signal e and the counter value signal d of the cyclic counter 21 are inputted into the sequence determining circuit 13, the access time allocation to the first and second processing circuits 10 and 11 can be implemented precisely.

<Third Embodiment>

In the third preferred embodiment of the present invention, the packet exchange in the foregoing first preferred embodiment is further provided with a protection circuit as in the foregoing second preferred embodiment.

Figure 7:
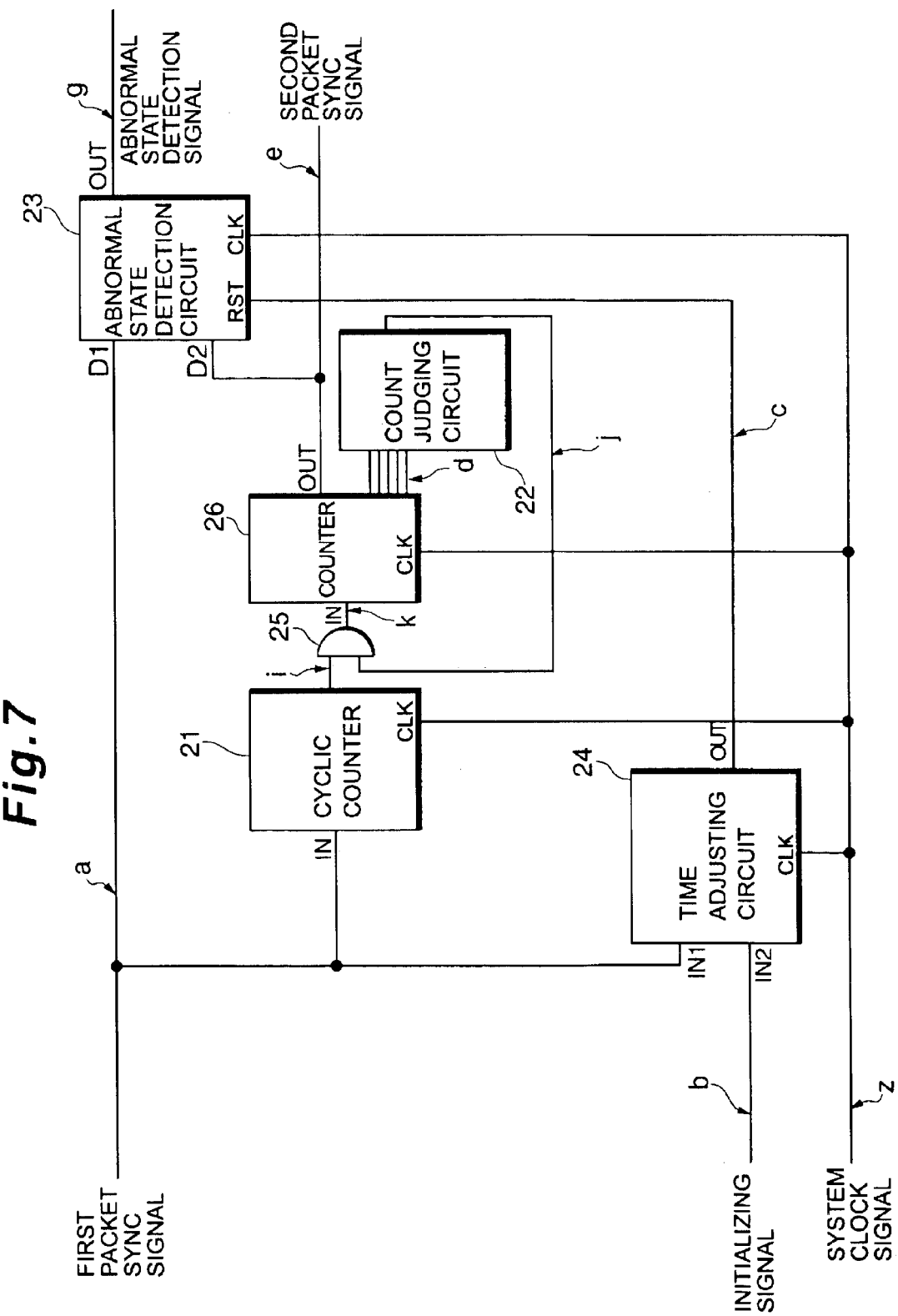
FIG. 7 is a diagram showing a configuration of a protection circuit incorporated in a packet exchange according to a third preferred embodiment of the present invention.
Figure 8:
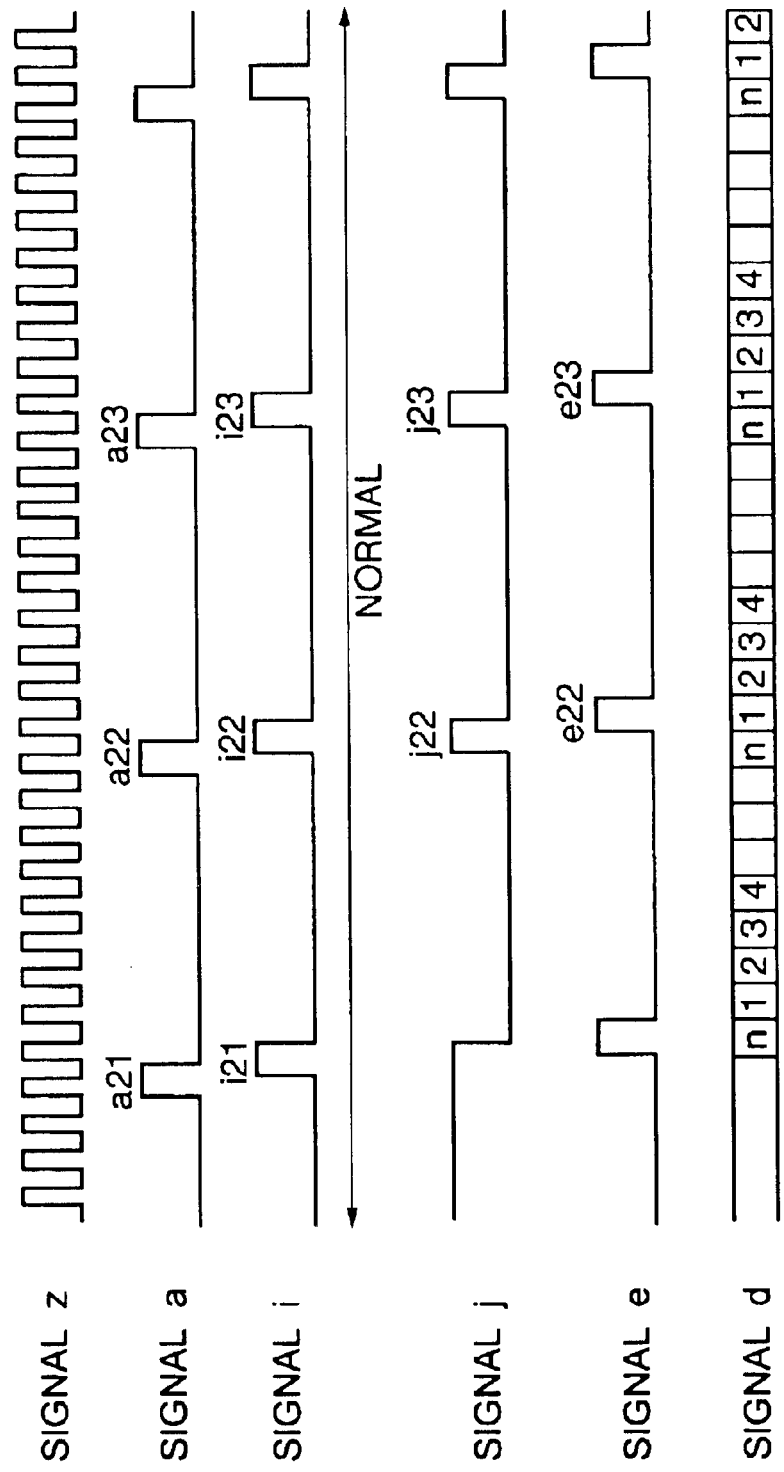
FIG. 8 is a diagram showing an operation of the protection circuit shown in FIG. 7 when a first packet synchronizing signal is in a normal state.
Figure 9:
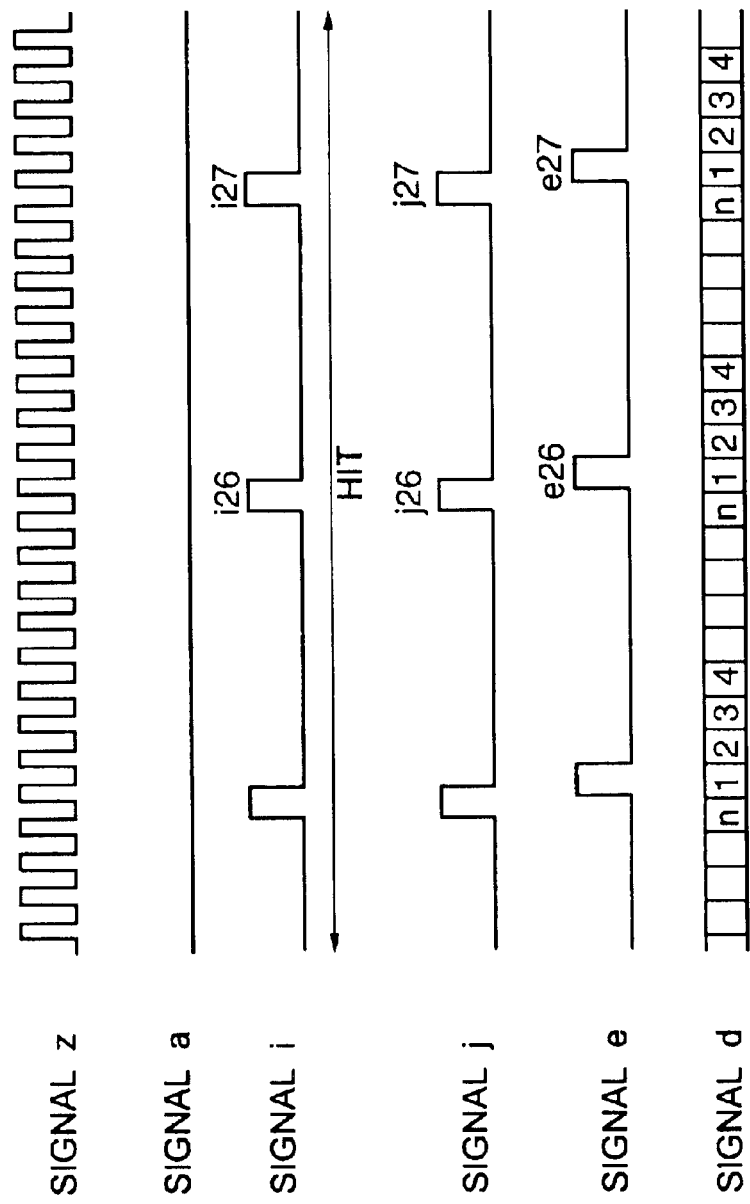
FIG. 9 is a diagram showing an operation of the protection circuit shown in FIG. 7 upon occurrence of a hit in the first packet synchronizing signal.
Figure 10:
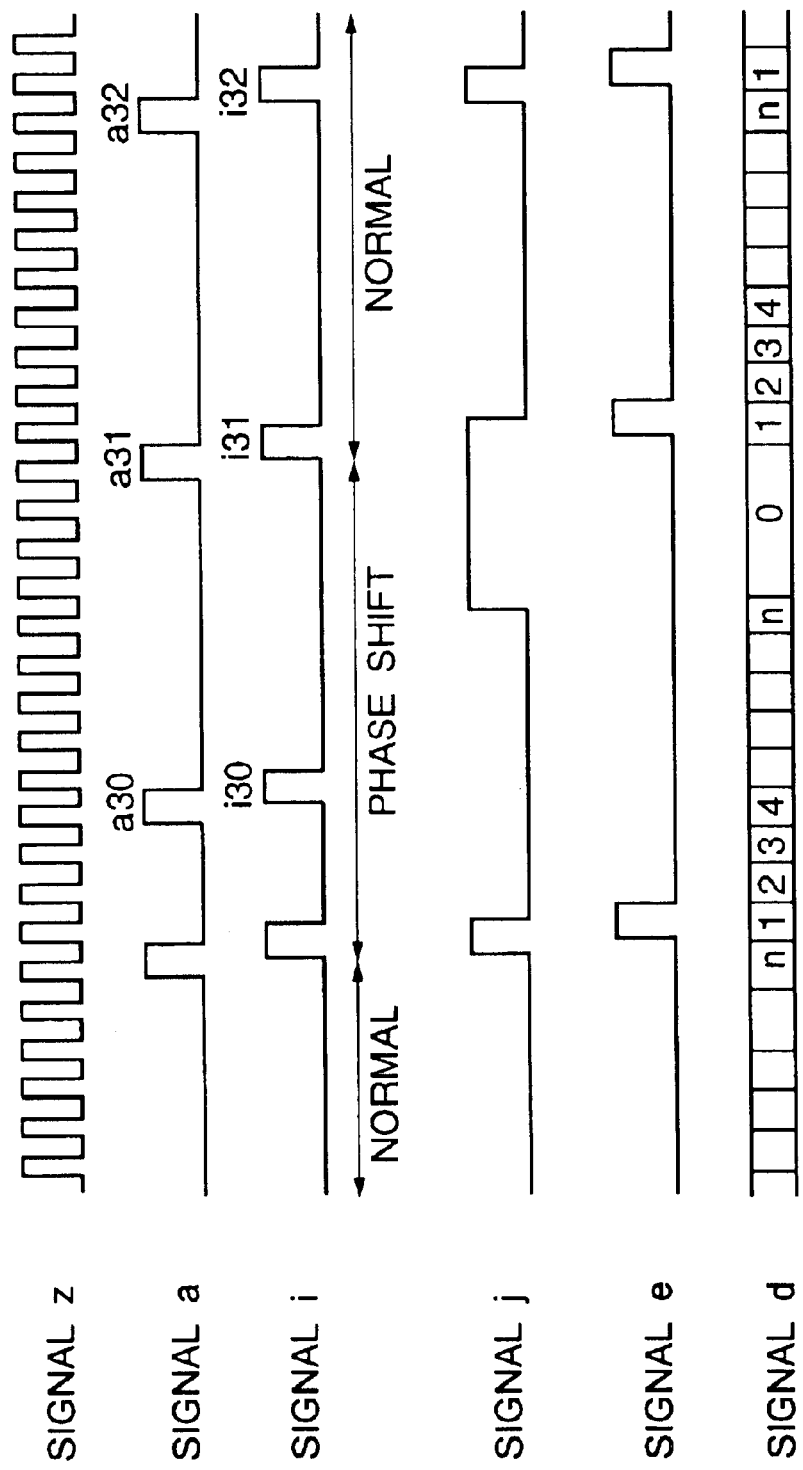
FIG. 10 is a diagram showing an operation of the protection circuit shown in FIG. 7 upon occurrence of a phase shift in the first packet synchronizing signal.

FIG. 7 shows a configuration of the protection circuit in the third preferred embodiment, and FIGS. 8 to 10 show operations of the protection circuit, respectively. As shown in FIG. 7, the protection circuit comprises a cyclic counter 21, a count judging circuit 22, an abnormal state detection circuit 23, a time adjusting circuit 24, a control circuit 25 and a counter 26. Operations of the abnormal state detection circuit 23 and the time adjusting circuit 24 are the same as those of the corresponding circuits 23 and 24 in the foregoing second preferred embodiment.

The control circuit 25 allows a pulse from the cyclic counter 21 to be fed to the counter 26 only when a signal j from the count judging circuit 22 is high in level. Once start counting, the cyclic counter 21 spontaneously repeats counting from 1 to n (n is an integer corresponding to the packet processing time 200 shown in FIG. 2) while no pulse is inputted thereto. Every time a counter value reaches n, the cyclic counter 21 outputs a pulse to the control circuit 25. On the other hand, in response to an input of a pulse in a first packet synchronizing signal a, the cyclic counter 21 is set to value n to output a pulse to the control circuit 25 and starts counting to value n. This operation itself is the same as that in the foregoing second preferred embodiment. As in the second preferred embodiment, the first packet synchronizing signal a corresponds to the packet synchronizing signal in the foregoing first preferred embodiment. The counter 26 corresponds to the counter 14 in the first preferred embodiment, and an output thereof is inputted into the sequence determining circuit 13 as a second packet synchronizing signal e. In response to an input of a pulse in a signal k from the control circuit 25, the counter 26 is set to value 1 to output a pulse in the second packet synchronizing signal e and starts counting to value n. Then, when no pulse is inputted upon counting value n, the counter 26 further counts up to value n+1 without producing a pulse in the second packet synchronizing signal e and stops its counting operation for awaiting an input of the next pulse. Then, in response to the next pulse input, the counter 26 is set to value 1 to output a pulse and starts counting again to value n. The count judging circuit 22 is inputted with a counter value signal d from the counter 26. The count judging circuit 22 outputs a high level in the signal j when the counter value of the counter 26 is n and n+1, while outputting a low level otherwise. During an initial state before the counter 26 starts counting, the count judging circuit 22 outputs a high level in the signal j. The signal j is inputted into the control circuit 25.

Now, operations of the protection circuit in this embodiment will be described with reference to FIGS. 8 to 10. For better understanding a relationship among the signals concerned, FIGS. 8 to 10 each show a time position relationship among pulses taking into consideration a lapse of time among the signals.

<Normal State>

An operation of the protection circuit when the first packet synchronizing signal a is in the normal state will be described with reference to FIG. 8.

As shown in FIG. 8, when a pulse a21 representing a boundary time point between adjacent packets is inputted, the cyclic counter 21 outputs a pulse i21. Thereafter, the cyclic counter 21 repeats counting from 1 to n and, upon every occurrence of counting value n, the cyclic counter 21 outputs pulses (i22, i23 . . . ). As described before in the foregoing second preferred embodiment, the cyclic counter 21 is set to value n to output a pulse in response to an input of a pulse. However, since the cycle of the first packet synchronizing signal a is the same as the counting cycle of the cyclic counter 21, no influence is caused on the counting cycle of the cyclic counter 21. When the pulse i21 is outputted, the signal j is high in the initial state so that the pulse i21 is inputted into the counter 26. In response to an input of the pulse i21, the counter 26 is set to value 1 to output a pulse in the second packet synchronizing signal e and starts counting to value n. Since the signal j becomes high (j22) when the counter 26 counts value n, a pulse i22 corresponding to a pulse a22 is inputted into the counter 26 via the control circuit 25. In response to an input of the pulse i22, the counter 26 is set to value 1 to output a pulse e22 and starts counting again to value n. This also applies to the next pulses a23, i23, j23, e23 and subsequent pulses. Thus, in the normal state of the first packet synchronizing signal a, the second packet synchronizing signal e which fully agrees with the first packet synchronizing signal a is obtained.

<Occurrence of Hit>

An operation of the protection circuit upon occurrence of a hit in the first packet synchronizing signal a will be described with reference to FIG. 9. It is assumed that the cyclic counter 21 has started its counting operation in response to an arbitrary pulse in the first packet synchronizing signal a.

As shown in FIG. 9, even if a hit occurs in the first packet synchronizing signal a, the cyclic counter 21 repeats counting from 1 to n to produce pulses (i26, i27 . . . ). When a pulse i26 is inputted into the control circuit 25, the signal j is high (j26) since the counter 26 counts up value n. Thus, the pulse i26 is inputted into the counter 26. In response to an input of the pulse i26, the counter 26 is set to value 1 to output a pulse e26 and starts counting again to value n. This also applies to pulses i27, j27, e27 and subsequent pulses. Thus, the second packet synchronizing signal e which is free of an occurrence of a hit in the first packet synchronizing signal a is obtained.

<Occurrence of Phase Shift>

An operation of the protection circuit upon occurrence of a phase shift in the first packet synchronizing signal a will be described with reference to FIG. 10. It is assumed that the cyclic counter 21 has started its counting operation in response to an arbitrary pulse in the first packet synchronizing signal a.

As shown in FIG. 10, when a pulse a30 which is advanced in phase as compared with the previous pulses (a21, a22 . . . shown in FIG. 8) is inputted, the cyclic counter 21 outputs a pulse i30 to the control circuit 25. At this moment, however, since the counter 26 is still counting toward value n, the signal j is still low. Thus, the pulse i30 is not inputted into the counter 26. Accordingly, the counter 26 continues counting to value n. As shown in FIG. 10, since no input is given upon counting value n, the counter 26 further counts up to value n+1 (actually, this value is counter value 0 as shown in FIG. 10, wherein the counter 26 stops its counting operation) and awaits an occurrence of the next input.

When a pulse a31 is inputted, the cyclic counter 21 outputs a pulse i31 to the control circuit 25. At this time, the signal j is high in response to value 0 (n+1) of the counter 26. Thus, the pulse i31 is inputted into the counter 26. In response to an input of the pulse i31, the counter 26 is set to value 1 to output a pulse e31 and starts counting again to value n.

When a pulse a32 with an interval of the packet processing time 200 from the pulse a31 is inputted, the cyclic counter 21 outputs a pulse i32 to the control circuit 25. At this time, the signal j is high in response to value n of the counter 26. Thus, the counter 26 outputs a pulse e32 and starts counting again.

Accordingly, even if the phase shift occurs in the first packet synchronizing signal a, the second packet synchronizing signal e can quickly follow the phase-shifted first packet synchronizing signal a. As appreciated, the second packet synchronizing signal e can be synchronized with the phase-shifted first packet synchronizing signal a within a time corresponding to value (2n−1). As further appreciated, an input of the pulse i30 (a30) into the counter 26 should be inhibited for preventing damage to data stored in the storage circuit 12 (FIG. 1). As further appreciated, even if the pulse a30 is only an unwanted pulse as shown in FIG. 5, the second packet synchronizing signal e free of such an unwanted pulse can be obtained.

As described above, according to the foregoing third preferred embodiment, even if the abnormal state occurs in the first packet synchronizing signal a, the second packet synchronizing signal e can be reliably produced as in the foregoing second preferred embodiment. Further, in the third preferred embodiment, even if a phase shift occurs in the first packet synchronizing signal a, the second packet synchronizing signal e can be quickly synchronized with the phase-shifted first packet synchronizing signal a. Since the second packet synchronizing signal e and the counter value signal d of the counter 26 are inputted into the sequence determining circuit 13, the access time allocation to the first and second processing circuits 10 and 11 can be implemented precisely.

<Fourth Embodiment>

Figure 11:
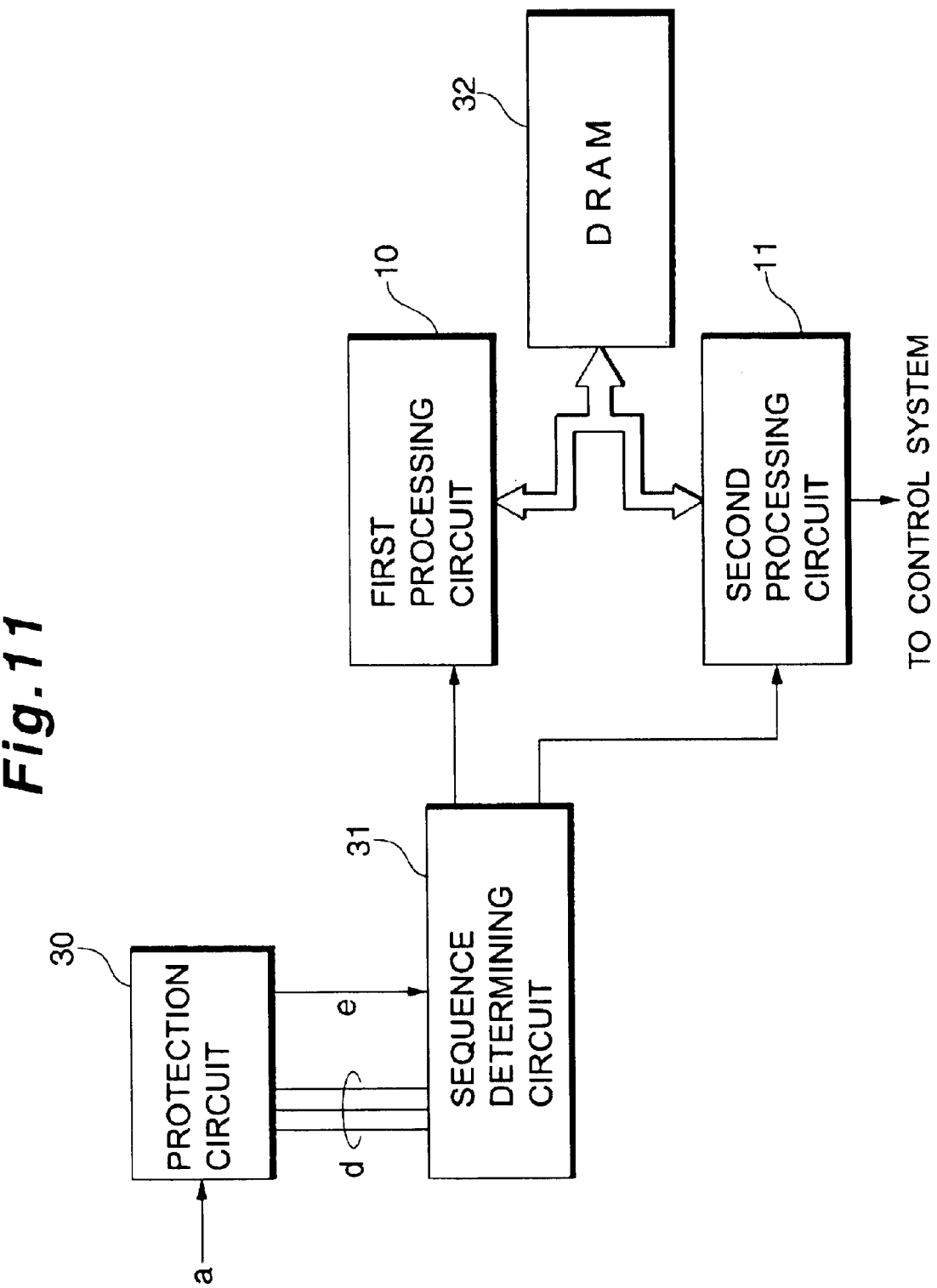
FIG. 11 is a diagram showing a configuration of a main part of a packet exchange according to a fourth preferred embodiment of the present invention.

FIG. 11 shows a configuration of a main part of a packet exchange according to the fourth preferred embodiment of the present invention. The packet exchange comprises a first processing circuit 10, a second processing circuit 11, a protection circuit 30, a sequence determining circuit 31 and a DRAM 32. The first processing circuit 10 is the same as that in the foregoing first preferred embodiment. The second processing circuit is also the same as that in the first preferred embodiment except it refreshes the DRAM 32. The DRAM 32 corresponds to the storage circuit 12 in the first preferred embodiment. The protection circuit 30 is the same as the protection circuit in the foregoing second or third preferred embodiment. Thus, the protection circuit 30 receives the first packet synchronizing signal a and produces the second packet synchronizing signal e. The sequence determining circuit 31 receives the counter value signal d and the second packet synchronizing signal e from the protection circuit 30. The sequence determining circuit 31 implements access time allocation to the first and second processing circuits 10 and 11 in the same manner as the sequence determining circuit 13 in the first preferred embodiment.

Figure 12:
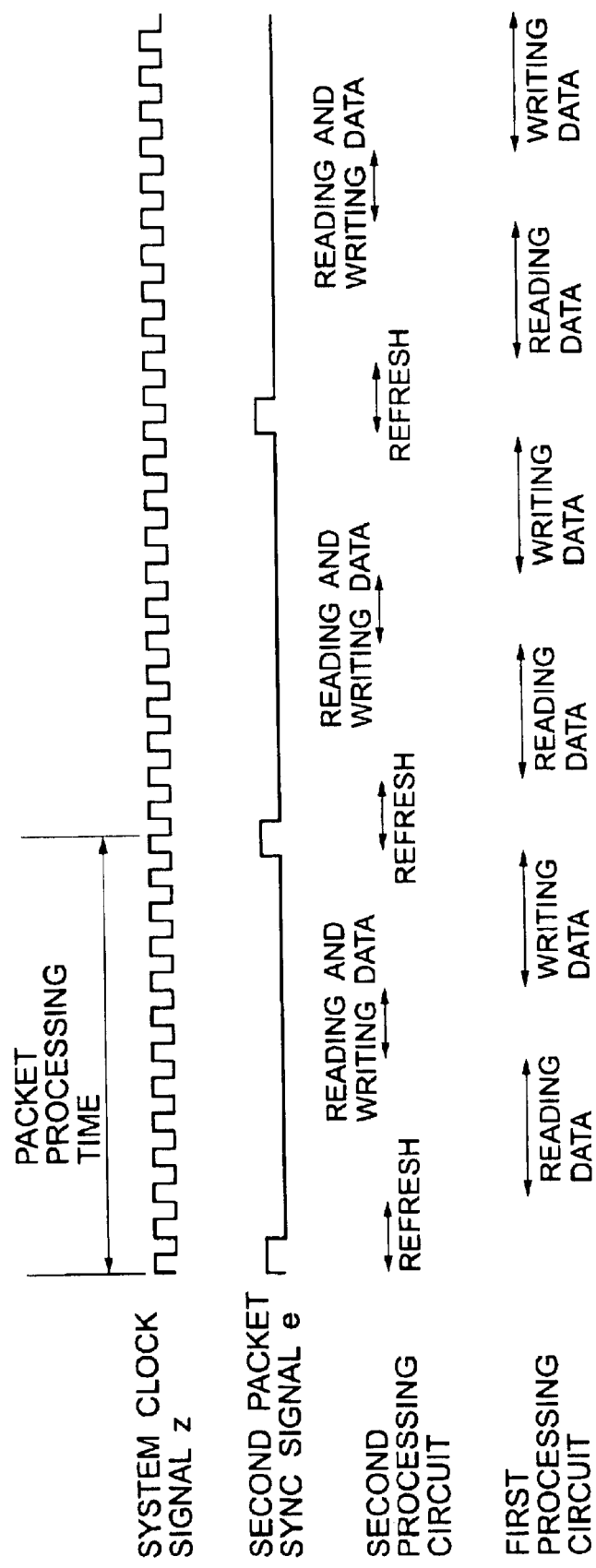
FIG. 12 is a diagram showing an operation of the packet exchange shown in FIG. 11.

FIG. 12 shows an operation of the packet exchange in this embodiment. The sequence determining circuit 31 implements access time allocation to the first and second processing circuits 10 and 11 as shown in FIG. 12. According to this access time allocation, the first processing circuit 10 performs reading and writing of data relative to the packet stream 100 (FIG. 1) and the DRAM 32, while the second processing circuit 11 performs refresh of the DRAM 32 and further performs reading and writing of data relative to the DRAM 32. Thus, the DRAM 32 can be refreshed per packet processing time. If the DRAM 32 is not necessarily refreshed per packet processing time, it is possible to refresh the DRAM 32 per m packet processing times (m is an arbitrary integer) by, for example, providing a counter for counting the number of packet processing times.

Assuming that the protection circuit 30 is the protection circuit in the second preferred embodiment, the DRAM 32 can be periodically refreshed according to the second packet synchronizing signal e produced by the cyclic counter 21, without being affected by an unwanted pulse or a hit caused in the first packet synchronizing signal a.

Figure 13:
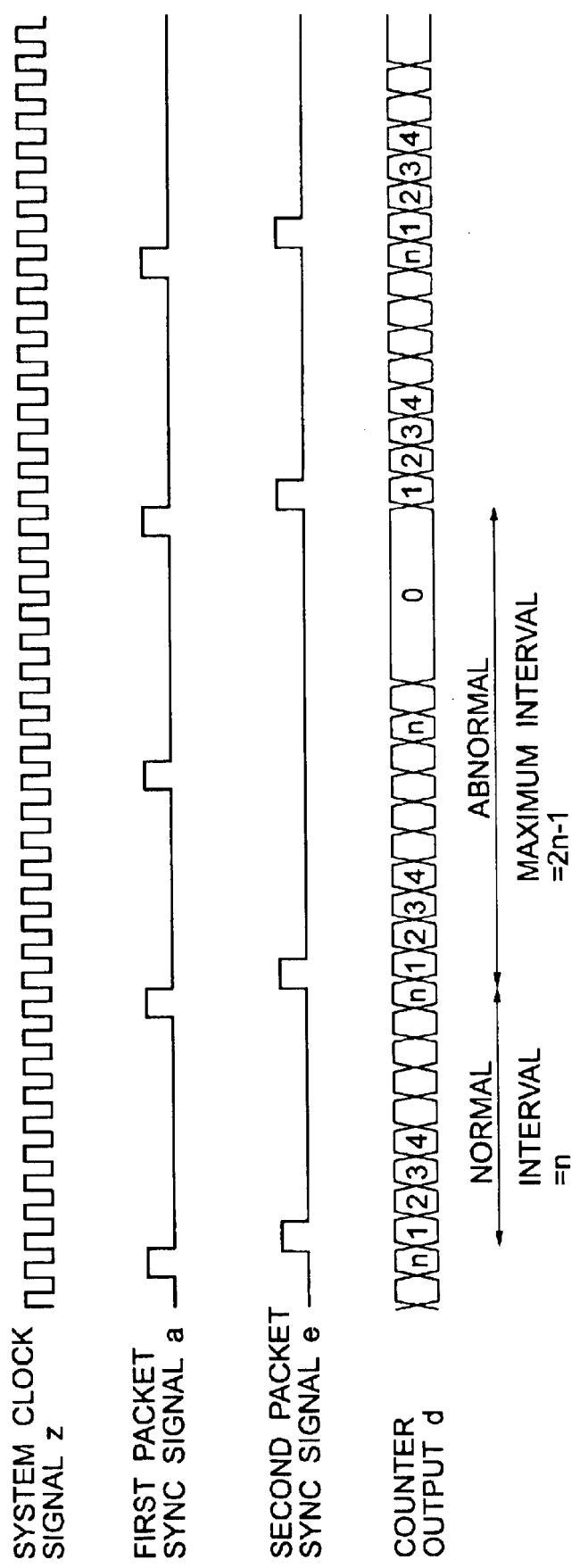
FIG. 13 is a diagram showing an operation of the packet exchange shown in FIG. 11, wherein the protection circuit shown in FIG. 7 is incorporated.

FIG. 13 shows an operation of the packet exchange using the protection circuit in the third preferred embodiment as the protection circuit 30. With this arrangement, since the protection circuit 30 allows the second packet synchronizing signal e to be synchronized with the phase-shifted first packet synchronizing signal a within a time corresponding to value (2n−1), the DRAM 32 can be refreshed before a lapse of the time (2n−1) even if a phase shift occurs in the first packet synchronizing signal a.

While the present invention has been described in terms of the preferred embodiments, the invention is not to be limited thereto, but can be embodied in various ways without departing from the principle of the invention as defined in the appended claims.

What is claimed is:

1. A packet communication apparatus for processing consecutive packets, said apparatus comprising:
    a storage circuit;
    a first processing circuit which accesses said storage circuit for executing first processing with respect to data obtained from each of said packets;
    a second processing circuit which accesses said storage circuit for executing second processing with respect to data stored in said storage circuit; and
    an allocation circuit for executing access time allocation with respect to a maximum packet processing time allowed for processing each of said packets and determined corresponding to packet length, said allocation circuit allocating a first time period of said maximum packet processing time to said first processing circuit for accessing said storage circuit and a second time period of said maximum packet processing time to said second processing circuit for accessing said storage circuit, said first time period and said second time period being prevented from overlapping with each other.

2. The packet communication apparatus according to claim 1, wherein said storage circuit is a DRAM, and said second processing circuit refreshes said DRAM during said second time period.

3. The packet communication apparatus according to claim 1, wherein said allocation circuit comprises a counter that receives a packet sync signal and a sequence determining circuit that receives the packet sync signal and a counter value signal from said counter, said first and second processing circuits being triggered by said sequence determining circuit.

4. A Packet communication apparatus for processing consecutive packets, said apparatus comprising:
    a storage circuit;
    a first processing circuit which accesses said storage circuit for executing first processing with respect to data obtained from each of said packets;
    a second processing circuit which accesses said storage circuit for executing second processing with respect to data stored in said storage circuit; and
    an allocation circuit for executing access time allocation with respect to a maximum packet processing time allowed for processing each of said packets and determined corresponding to packet length, said allocation circuit allocating a first time period of said maximum packet processing time to said first processing circuit for accessing said storage circuit and a second time period of said maximum packet processing time to said second processing circuit for accessing said storage circuit, said first time period and said second time period being prevented from overlapping with each other; and
    a producing circuit which receives a first packet synchronizing signal having first signal components each indicative of a boundary time point between adjacent packets and produces a second packet synchronizing signal based on said first packet synchronizing signal;
    wherein said producing circuit, in response to one of said first signal components, produces in sequence second signal components of said second packet synchronizing signal at a given cycle corresponding to said packet processing time, said given cycle being free of an influence of said first signal components subsequent to said one of said first signal components; and
    wherein said allocation circuit executes said access time allocation based on said second packet synchronizing signal.

5. The packet communication apparatus according to claim 4, wherein said producing circuit comprises a counter which produces in sequence said second signal components at said given cycle in response to said one of said first signal components, and a control circuit which inhibits any of said first signal components asynchronous with said given cycle from being inputted into said counter.

6. A packet communication apparatus for processing consecutive packets, said apparatus comprising:
    a storage circuit;
    a first processing circuit which accesses said storage circuit for executing first processing with respect to data obtained from each of said packets;
    a second processing circuit which accesses said storage circuit for executing second processing with respect to data stored in said storage circuit; and
    an allocation circuit for executing access time allocation with respect to a maximum packet processing time allowed for processing each of said packets and determined corresponding to packet length, said allocation circuit allocating a first time period of said maximum packet processing time to said first processing circuit for accessing said storage circuit and a second time period of said maximum packet processing time to said second processing circuit for accessing said storage circuit, said first time period and said second time period being prevented from overlapping with each other; and
    a producing circuit which receives a first packet synchronizing signal having first signal components each indicative of a boundary time point between adjacent packets and produces a second packet synchronizing signal based on said first packet synchronizing signal;
    wherein said producing circuit produces second signal components of said second packet synchronizing signal in response to said first signal components such that any of said first signal components which is advanced in phase relative to said packet processing time is prevented from reflecting on said second packet synchronizing signal; and
    wherein said allocation circuit executes said access time allocation based on said second packet synchronizing signal.

7. The packet communication apparatus according to claim 6, wherein said producing circuit comprises a control circuit which receives said first signal components, and a first counter which produces each of said second signal components in response to a corresponding input from said control circuit, and wherein said control circuit inhibits any of said first signal components, which is advanced in phase relative to said packet processing time, from being inputted into said first counter.

8. The packet communication apparatus according to claim 7, wherein said producing circuit further comprises a second counter which, in response to an input of each of said first signal components, outputs a corresponding signal component to said control circuit, while said second counter outputs a signal component to said control circuit at a given cycle corresponding to said packet processing time when no input is given to said second counter.

9. A packet communication apparatus for processing consecutive packets, said apparatus comprising:

a DRAM;

a processing circuit which accesses said DRAM for processing data obtained from each of said packets;

a refresh circuit for refreshing said DRAM; and an allocation circuit for executing access time allocation with respect to a maximum packet processing time allowed for processing each of said packets and determined corresponding to packet length, said allocation circuit allocating a first time period of said maximum packet processing time to said processing circuit for accessing said DRAM and a second time period of said maximum packet processing time to said refresh circuit for refreshing said DRAM, said first time and said second time being prevented from overlapping with each other.

10. The packet communication apparatus according to claim 9, wherein said allocation circuit comprises a counter that receives a packet sync signal and a sequence determining circuit that receives the packet sync signal and a counter value signal from said counter, said and second processing circuits being triggered by said sequence determining circuit.

* * * * *